(12) United States Patent
Subramanian et al.

(10) Patent No.: US 8,364,985 B1
(45) Date of Patent: Jan. 29, 2013

(54) BUFFER-CACHES FOR CACHING ENCRYPTED DATA VIA COPY-ON-ENCRYPT

(75) Inventors: Ananthan Subramanian, Menlo Park, CA (US); Zi-Bin Yang, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 455 days.

(21) Appl. No.: 12/636,536

(22) Filed: Dec. 11, 2009

(51) Int. Cl.
*H04L 9/32* (2006.01)
(52) U.S. Cl. .......................... 713/193; 711/164; 709/223
(58) Field of Classification Search .................. None
See application file for complete search history.

(56) References Cited

U.S. PATENT DOCUMENTS

| | | | |
|---|---|---|---|
| 7,660,959 B2 * | 2/2010 | Asher et al. | 711/164 |
| 8,117,464 B1 * | 2/2012 | Kogelnik | 713/193 |
| 2003/0188181 A1 * | 10/2003 | Kunitz et al. | 713/193 |
| 2008/0052537 A1 * | 2/2008 | Nishizono | 713/193 |
| 2009/0164780 A1 * | 6/2009 | Murayama et al. | 713/165 |
| 2009/0327757 A1 * | 12/2009 | Kito et al. | 713/193 |
| 2010/0083005 A1 * | 4/2010 | Ito et al. | 713/193 |
| 2011/0161675 A1 * | 6/2011 | Diard | 713/189 |

* cited by examiner

*Primary Examiner* — Fikremariam A Yalew
(74) *Attorney, Agent, or Firm* — Blakely, Sokoloff, Taylor & Zafman LLP

(57) ABSTRACT

Encryption using copy-on-encrypt determines that plaintext data stored in a plaintext buffer is to be written out to an encrypted storage resource. In response to the determining, an encryption buffer is allocated. The plaintext data is copied from the plaintext buffer to the encryption buffer and the encryption buffer is encrypted. Encrypted data from the encryption buffer is written to the encrypted storage resource. The encryption buffer is de-allocated. Read or write requests from a client are satisfied by retrieving the plaintext data from the plaintext buffer.

17 Claims, 8 Drawing Sheets

BUFFER-CACHES FOR CACHING ENCRYPTED DATA VIA COPY-ON-ENCRYPT

FIELD OF THE INVENTION

This invention relates generally to storage management, and more particularly to encryption of stored data.

BACKGROUND

A storage server is a processing system that is used to store and retrieve data on behalf of one or more clients on a network. A storage server operates on behalf of one or more clients to store and manage data in a set of mass storage devices, such as magnetic, optical or solid-state storage-based disks or tapes. In conventional network storage systems, the mass storage devices can be organized into one or more groups of drives (e.g., redundant array of inexpensive drives (RAID)).

A storage server can be configured to service file-level requests from clients, as in the case of file servers used in a Network Attached Storage (NAS) environment. Alternatively, a storage server can be configured to service block-level requests from clients, as done by storage servers used in a Storage Area Network (SAN) environment.

Further, some storage servers are capable of servicing both file-level and block-level requests, or other types of data access such as content-level requests, as done by certain storage servers made by NetApp, Inc. of Sunnyvale, Calif.

Some storage servers manage the storage of different kinds of data on storage subsystems, including sensitive data such as credit card numbers or social security numbers. If a disk is acquired by an unauthorized third party, data stored on that disk may be accessed and misused. Encrypting that data while it is stored on the disk makes it significantly more difficult for an unauthorized third party to access the data.

Various reasons exist to delete data from a disk. For example, if the disk is to be retired from use, sensitive data is deleted from the disk. One way of deleting data from a disk is to reformat the disk to zero-out all of the data storage in the disk. Another way of deleting all or part of a disk is to encrypt the portion of data to be deleted, and then destroy the key.

Effective on-disk encryption requires that a plaintext, or un-encrypted, version of data not be written to disk. Existing solutions encrypt the data while it is stored in memory, such as a cache. Encrypting the data in the cache prevents using that data to satisfy a cache read, since the cache read requires a plaintext version of the data. The plaintext version of the data is destroyed when the data is encrypted in the cache.

SUMMARY

Encryption using copy-on-encrypt determines that plaintext data stored in a plaintext buffer is to be written out to an encrypted storage resource. In response to the determination, an encryption buffer is allocated. The plaintext data is copied from the plaintext buffer to the encryption buffer and the encryption buffer is encrypted. Encrypted data from the encryption buffer is written to the encrypted storage resource. The encryption buffer is de-allocated and a request from a client is satisfied by retrieving the plaintext data from the plaintext buffer. The original plaintext buffer is accessible for clients to read from or write into.

The present invention is described in conjunction with systems, clients, servers, methods, and computer-readable storage media of varying scope. In addition to the aspects of the present invention described in this summary, further aspects of the invention will become apparent by reference to the drawings and by reading the detailed description that follows.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
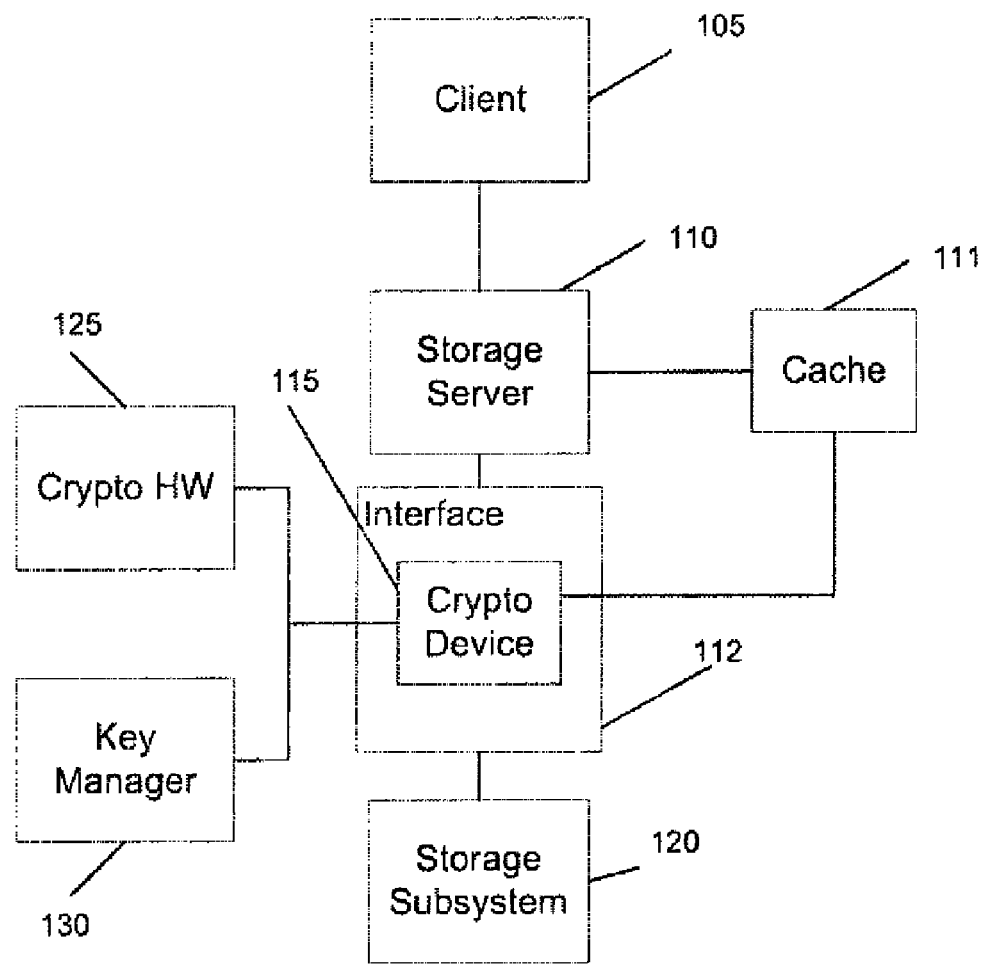
FIG. 1 is a diagram illustrating a system-level overview of encryption with copy-on-encrypt.

FIG. 1 is a diagram illustrating a system-level overview of encryption with copy-on-encrypt. Client 105 interacts with storage server 110, for example, by requesting that data be accessed or saved. Storage server 110 communicates with one or more storage subsystems 120 through storage interface 112. Storage server is coupled to cache 111 which is used to provide fast access to recently or frequently used data. Storage interface 112 includes crypto device 115, which may be hardware or software. Crypto device 115 is coupled to crypto hardware ("HW") 125 and key manager 130. When storage server 110 processes a request to read data from an encrypted storage resource (e.g., a volume), crypto device 115 decrypts the data using crypto HW 125 and a key from key manager 130 into plaintext before loading it into the cache 111 so the data is useful to client 105 or whatever other entity requested the data. The key manager may be a separate hardware device. The crypto device may be a software layer coupled to the storage subsystem 120. The crypto device 115 may interface with a hardware cryptography device such as crypto HW 125. In another embodiment, crypto 125 may be software running on, for example, storage server 110.

In one embodiment, data belonging to some or all volumes in a storage environment is encrypted before it is written to disk. Encrypting data prior to writing data is described in greater detail below in conjunction with FIG. 3. Encrypting data before writing the data to disk enhances the protection provided by the encryption, because there is no plaintext (i.e., un-encrypted) version of the encrypted data on the disk.

Figure 2:
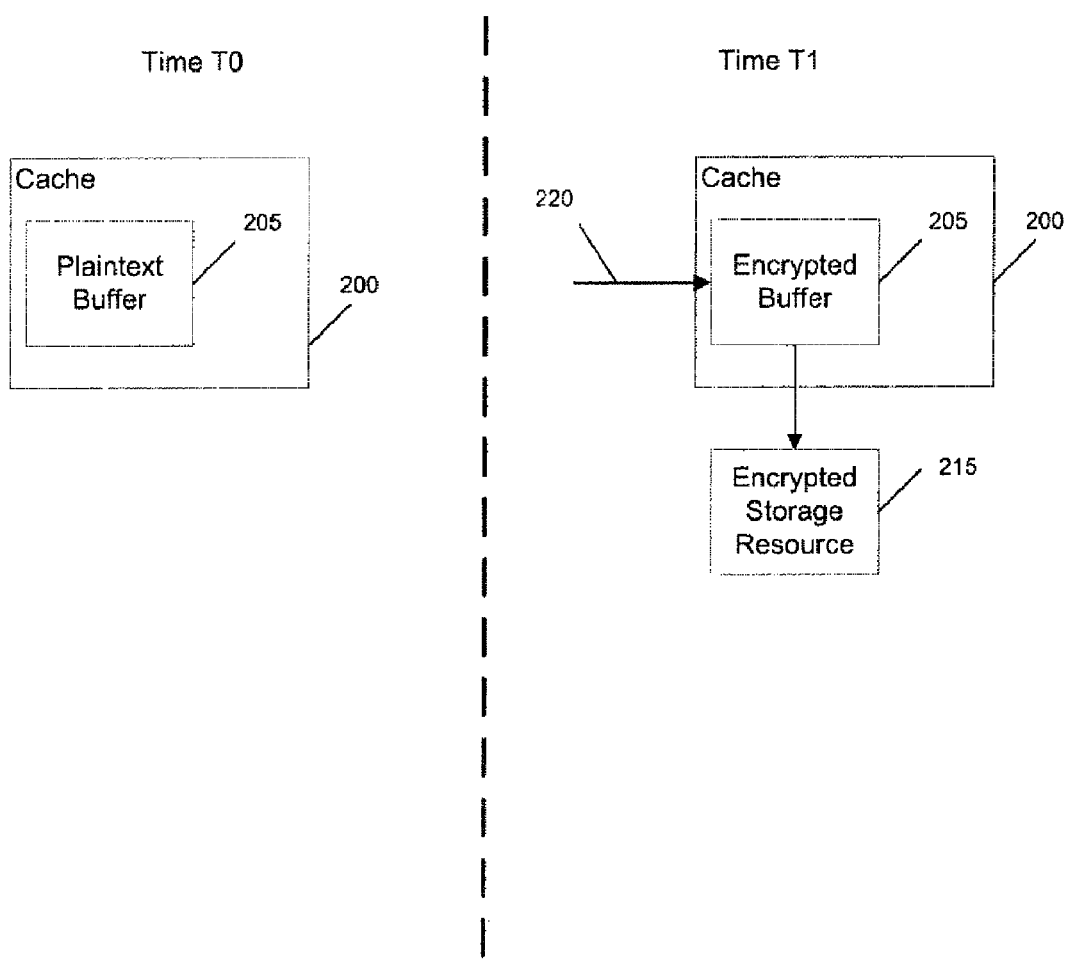
FIG. 2 is a diagram illustrating encryption of data in-place before the data is written to disk.

FIG. 2 is a diagram illustrating encryption of data before it is written to disk. For example, cache 200 of FIG. 2 may correspond to different states of the cache 111 in FIG. 1. At time T0, cache 200 includes a plaintext buffer 205. Buffer 205 contains data that needs to be written to an encrypted storage resource (e.g., a volume). Before it can be written out, the data in the buffer 205 is encrypted. At time T1, after encryption, buffer 205 contains an encrypted version of the plaintext data from time T0. This data is written out to encrypted storage resource 215. However, the data in buffer 205 is now useless for cache read/write 220, since the data in buffer 205 is now encrypted. Thus, cache read 220 will fail, and the data requested by cache read 220 will be read from disk, decrypted, and then returned to the entity that sent cache read 220 (e.g., client 105). This may significantly degrade the performance of the cache 200.

Figure 3:
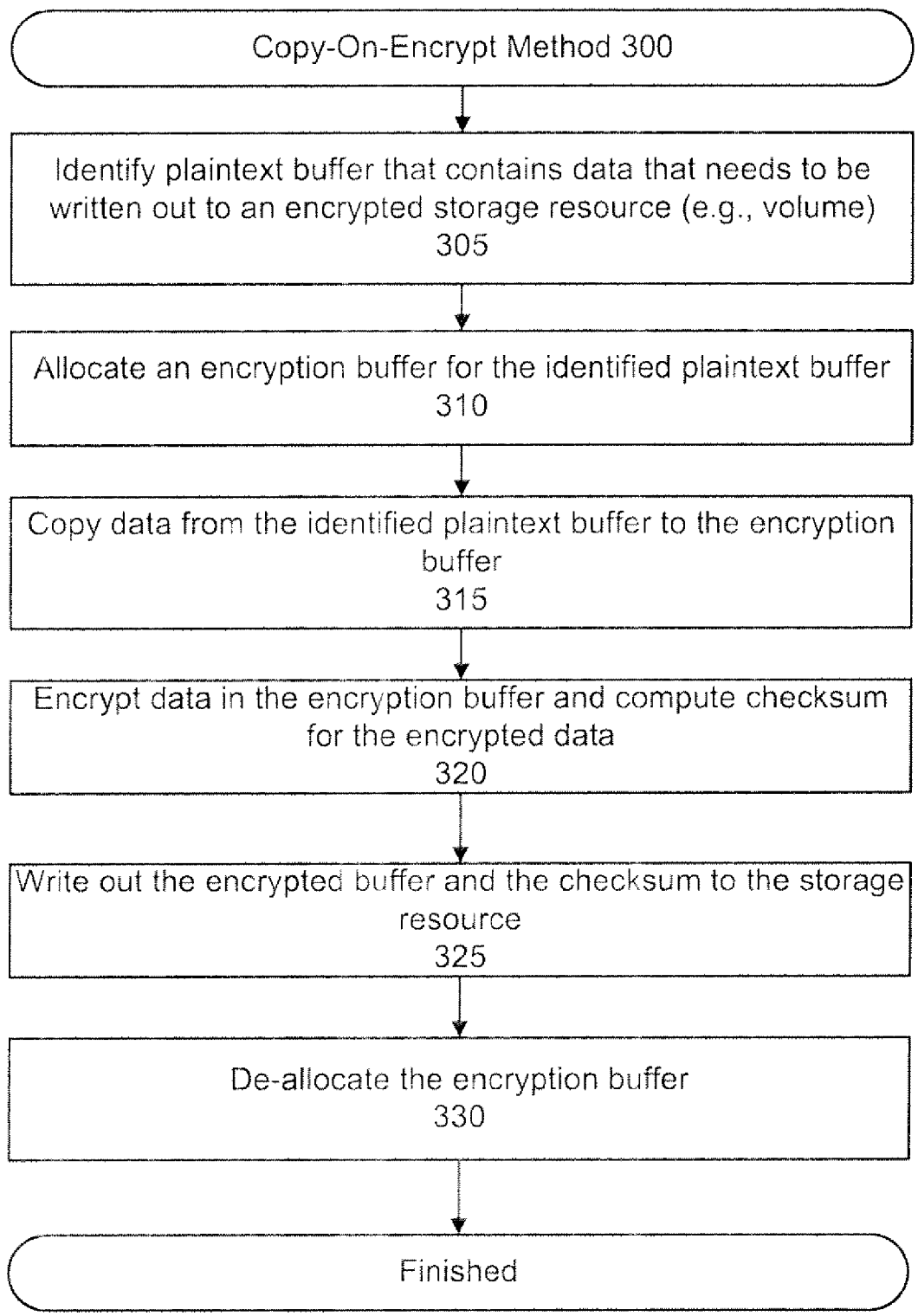
FIG. 3 is a flow chart illustrating a copy-on-encrypt method.

FIG. 3 is a flow chart illustrating a copy-on-encrypt method 300. At block 305, the method 300 identifies a plaintext buffer that contains data that needs to be written out to an encrypted storage resource. A storage resource, or storage object, may be a volume. A volume may be a logical storage component physically stored on one or more disk drives, flash drives, etc. A storage resource may be a disk drive, or a file stored on a disk drive. The identifying may comprise scanning through allocated buffers in a cache and checking the value of a flag. For example, each buffer may be associated with a flag variable. The flag variable may be allocated in memory when the buffer is allocated. If the value of the flag indicates that the corresponding contents of the buffer are plaintext and need to be encrypted and written out, it identifies the buffer. If the value of flag does not indicate that contents of the buffer need to be written out to disk, the buffer is not identified. By iterating through the flag variables associated with allocated buffers in the cache, the method 300 identifies one or more plaintext buffers that contain data that needs to be written out to an encrypted storage resource. In one embodiment, identifying the plaintext buffers is performed by a separate allocation process.

In one example, storage server 110 may be performing a consistency point operation in which buffers are written out to disk. In one embodiment, the consistency point operation is implemented as a special type of snapshot. The consistency point snapshot writes out data in the cache to disk. This may improve recovery from an improper shutdown, since the consistency point may be used to rapidly return to the most recent version of the data. A snapshot may be a copy of a set of files and directories as they were at a particular point in the past.

At block 310, the method 300 allocates an encryption buffer for the identified plaintext buffer. Allocation may include providing a memory address of a region of memory that the method 300 can use as an encryption buffer or a plaintext buffer. The allocation may be performed by a memory management system as is known in the art. The encryption buffer is a region of memory used by the method 300 to store an encrypted version of the data stored in the plaintext buffer. This buffer may be allocated from unused transient storage in the same cache as the plaintext buffer.

At block 315, the method 300 copies the data from the plaintext buffer to the newly allocated encryption buffer. Block 315 may also include updating the value of a pointer that points at data that is to be written out by the storage subsystem to point at the encryption buffer, while leaving the value of a pointer that points at data available for cache reads unchanged and pointing to the plaintext buffer. Cached writes can also benefit because they can write for the next consistency point safely without having to do a read-decrypt-modify cycle.

At block 320, the method 300 encrypts the data in the encryption buffer. The method 300 may encrypt the data in-place by replacing the plaintext data located in the encryption buffer with the corresponding encrypted data. In one embodiment, the crypto engine (HW/SW) also computes checksums of the input (plaintext) and output (encrypted) data. These checksums are stored with the corresponding data copies. For example, the checksum on encrypted data is written to disk along with the encrypted data while the checksum on the plaintext data is kept in the buffer cache along with the plaintext client accessible data. The checksum may be stored on disk as part of the encrypted data. The checksum may also be stored separately from the encrypted data, including on a different storage system.

In another embodiment, the method 300 sets a value to-encrypt flag associated with the encryption buffer. The new value of the flag indicates that the contents of the encryption buffer are currently plaintext and needs to be encrypted before the contents of the buffer can be written out to a storage resource. In this embodiment, an encryption process separate from the method 300 scans through the to-encrypt flags similarly to the scanning described above, and when the separate process identifies an encryption buffer with contents that need to be encrypted, the separate process encrypts the content. In this embodiment, the separate process that encrypts the data may set the flag indicating that the encrypted contents are ready to be written out, which may be identified by the separate write-out process described below.

At block 325, the encrypted buffer is written out to the encrypted storage resource. In another embodiment, the method 300 changes the value of a flag variable associated with the encrypted buffer to mark the buffer as being encrypted and ready to be written out. A separate write-out process from the method 300 may scan the buffers and detect the new value of the flag. In response to identifying the new value of the flag, the separate process may write out the encrypted buffer to persistent storage.

At block 330, the method 300 de-allocates the encryption buffer and returns the allocated cache memory to the unused portion of the cache. De-allocation of the encryption buffer may also be performed by the memory management system. De-allocating the buffer may cause the memory management system to mark the region of memory corresponding to the buffer as available for subsequent allocation. In one preferred embodiment, the size of the buffer cache is configured to be larger than the amount of data being written out during a consistency point operation. In this embodiment, since plaintext and encrypted versions of data are only needed for data being written out, the presence of two copies (i.e., encrypted and plaintext) of some data does not significantly impact cache performance or availability.

In one embodiment, read and write requests for the plaintext data stored in the buffer cache are received while the method 300 is performing blocks 305 through 330. In this embodiment, read and write requests are satisfied while the method 300 is executing. The method 300 may satisfy the requests in parallel with blocks 305 through 330. Alternatively, a different process may satisfy the requests by writing data to the buffer cache or reading plaintext data from the buffer cache. The read and write requests can be satisfied in parallel and/or simultaneously with blocks 305 through 330, since the data to be encrypted and written out ("in flight data") does not destroy the plaintext version.

In one embodiment, the allocation process, the encryption process, and the write-out process each execute within separate threads of execution. The threads may execute asynchronously as is known in the art. The threads may execute on the same processor at different times, or on multiple processors at similar times, or on multiple processors at different times.

Figure 4:
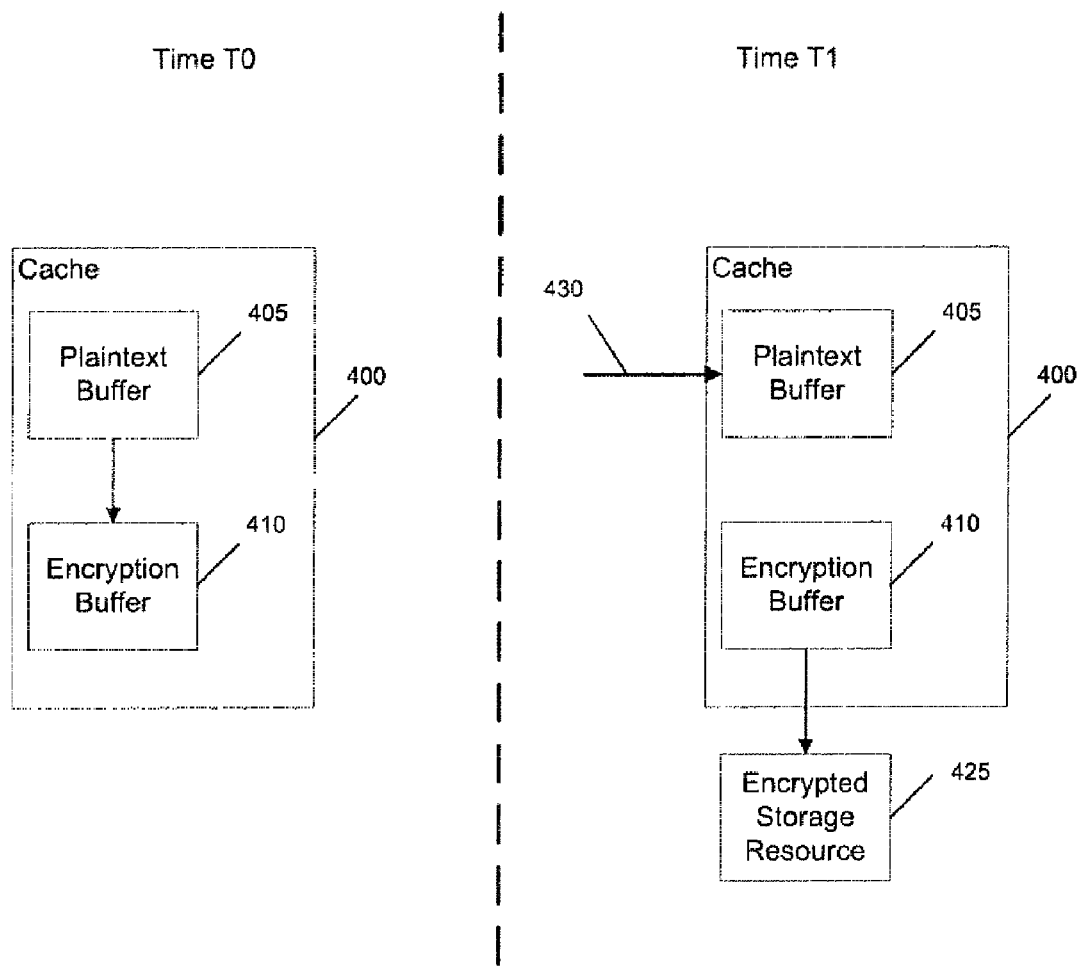
FIG. 4 is a diagram illustrating an application of the copy-on-encrypt method of FIG. 3.

FIG. 4 is a diagram illustrating the application of the copy-on-encrypt method 300. At time T0, cache 400 includes plaintext buffer 405 and newly allocated encryption buffer 410. Plaintext data from buffer 405 is copied into encryption buffer 410. The plaintext data in encryption buffer 410 is encrypted at time T1 and can be written out to encrypted storage resource 425. The data in buffer 405 remains plaintext at time T1 and can satisfy the cache read/write 430, avoiding a disk access and improving performance for the entity that requested cache read 430.

Figure 5:
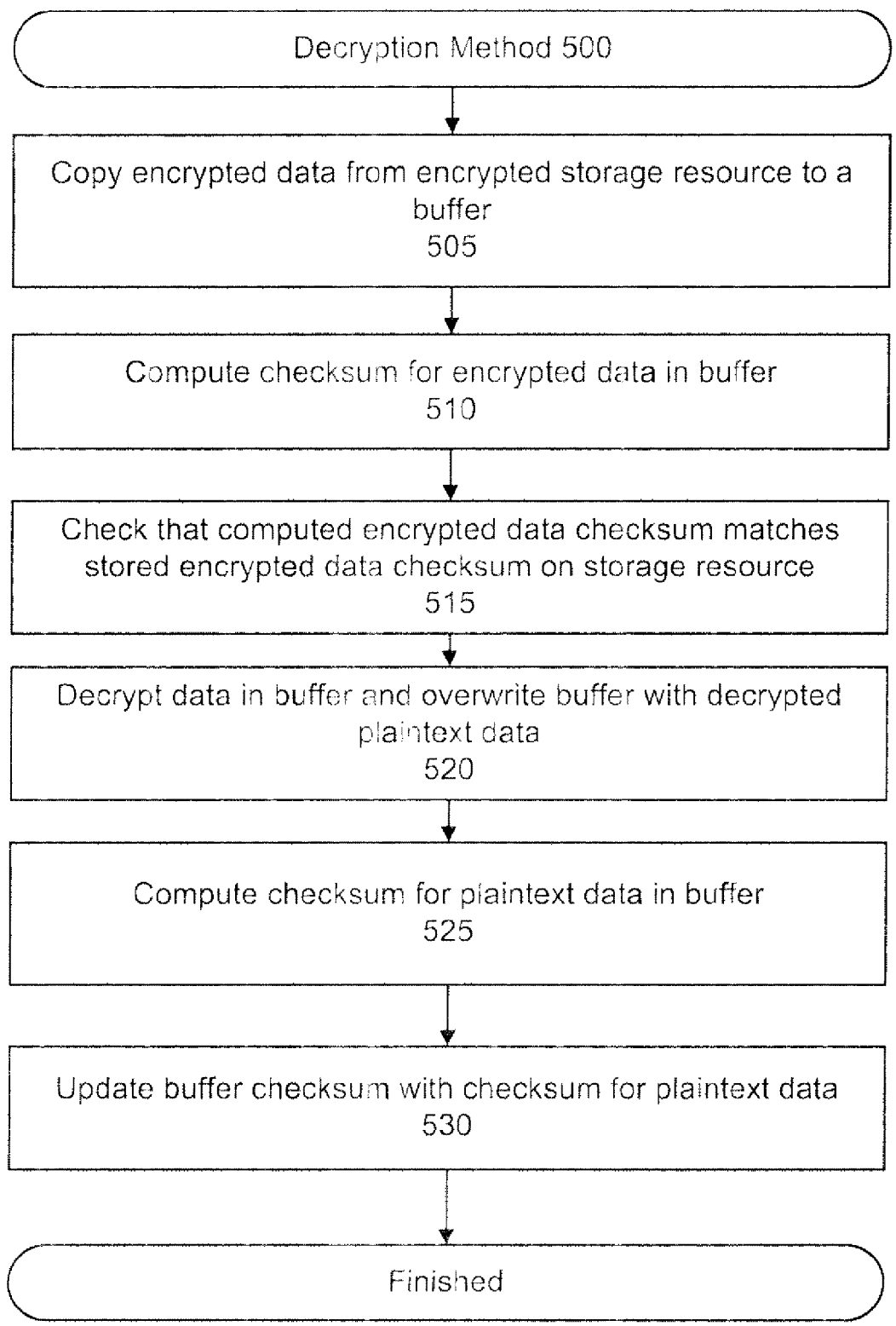
FIG. 5 is a flowchart illustrating a method of decryption.

FIG. 5 is a flow chart illustrating a decryption method 500. At block 505, the method 500 copies encrypted data from an encrypted storage resource to a buffer. The data may have been requested from the storage resource as the result of a failed cache read. At block 510, the method computes a checksum for the encrypted data in the buffer. At block 515, the method 500 checks that the checksum value computed at block 510 matches the checksum value stored on the encrypted storage resource. A checksum may be a number representing the sum of digits in an instance of digital data. The checksum may also be a cryptographic hash of the data computed using the crypto HW. Comparing the computed checksum with the stored checksum may indicate whether the encrypted data has been modified, compromised, or corrupted. If the data appears modified or corrupted, known techniques may be used to recover the data, such as RAID data recovery.

At block 520, the method 500 decrypts data in the buffer and overwrites the buffer with the decrypted plaintext data. At block 525, the method 500 computes a checksum for the plaintext data and at block 530 the method 500 updates the checksum value corresponding to the buffer with the checksum of the plaintext data. The plaintext buffer is now accessible for cache reads.

Figure 6:
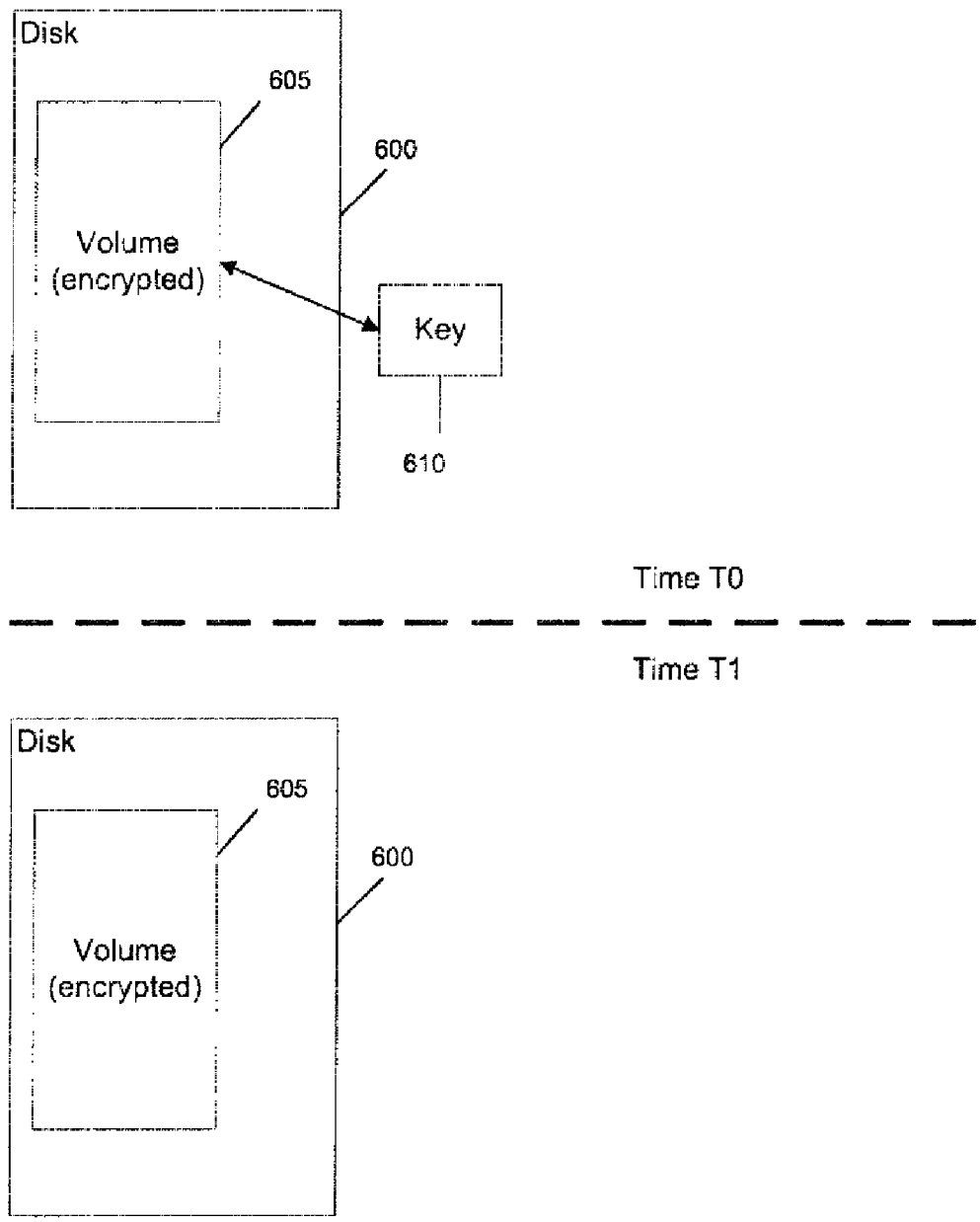
FIG. 6 is a diagram illustrating a use of encrypted volumes in the contexts of data deletion and lost disks.

FIG. 6 is a diagram illustrating the use of encrypted volumes in a data deletion context. At time T0, disk 600 includes volume 605, which may be encrypted by key 610 using copy-on-encrypt method 300. A storage server or other entity receives an input indicating to delete volume 600. At time T1, storage server or other entity has deleted key 610. As a result, volume 605 cannot be accessed, since the only means of accessing the encrypted data stored on volume 605 has been destroyed. The data on volume 605 is effectively deleted by deleting key 610.

FIG. 6 also illustrates the use of encrypted volumes in a lost disk context. If, at time T1, key 610 has not been destroyed, but rather, disk 600 has been physically acquired by an unauthorized third party, the encrypted volume 605 is not accessible by the third party because they lack the key 610.

In other embodiments, the data granularity does not have to be a full volume. It can be file-level encryption and allow clients to specify that only sensitive files written by them should be shreddable by key destruction. A key may be shredded by deleting the key, thereby preventing the key from being used to un-encrypt data. The scope of a single key can be a file, group of files (directory for example) or the entire volume. In other embodiments, any storage object may be used as the scope for a key. Copy-on-encrypt allows the buffer cache to be usable in all these embodiments without decreasing cache performance. Encrypted disks can be used to physically ship huge amounts of data securely. the key itself is not stored on the encrypted disk. Instead, they key may be stored on a different storage device and transported using a different channel. For example, the key may be stored on a compact flash drive and transferred by a courier, while the encrypted data is transmitted over the Internet.

Figure 7:
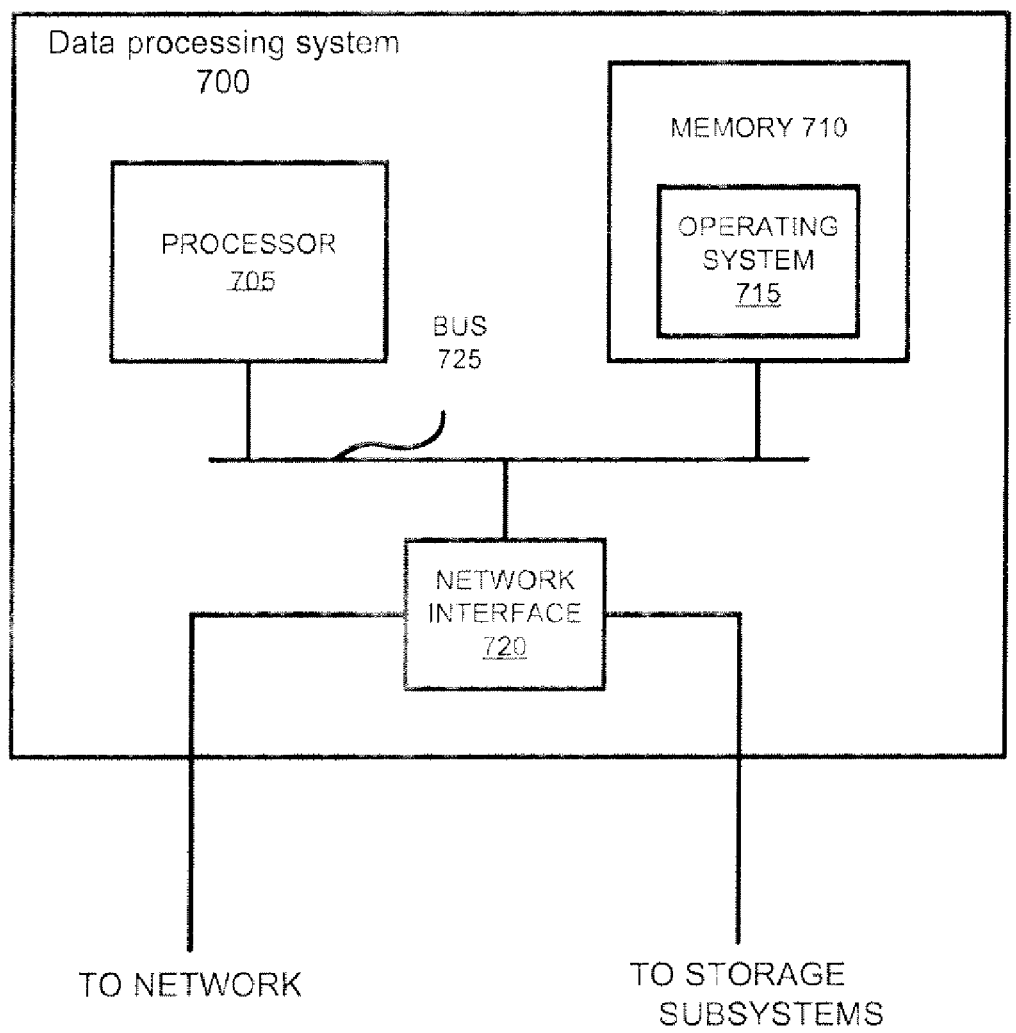
FIG. 7 is a diagram of a data processing system.

The storage server 105 of FIG. 1 is now described in more detail with reference to FIG. 7. One embodiment of the storage server 105 may be implemented on a system (e.g., a server) as illustrated in FIG. 7. Referring to FIG. 7, the data processing system 700 includes a processor 705, a memory 710, and a network interface 720, which are coupled to each other via a bus system 725. The bus system 725 may include one or more buses and/or interconnects. The data processing system 700 communicates with a network (e.g., the Internet) via the network interface 720, which can be an Ethernet adaptor, fiber channel adaptor, etc. The network interface 720 may be coupled to a public network, a private network, or a combination of both in order to communicate with a client machine usable by an administrator or client of the storage server 105.

In one embodiment, the processor 705 reads instructions from the memory 710 and executes the instructions. The memory 710 may include any of various types of memory devices, such as, for example, random access memory (RAM), read-only memory (ROM), flash memory, one or more mass storage devices (e.g., disks), etc. The memory 710 stores instructions of an operating system 715. The processor 705 may retrieve the instructions from the memory 710 to run the operating system 715. The data processing system 700 interfaces with one or more storage subsystems via the network interface 720. In other embodiments, the data processing system 700 may interface with storage subsystems via a storage adaptor (not shown), which may include a small computer system interface (SCSI) adaptor, fiber channel adaptor, etc. In one embodiment, memory 710 may be a flash-based solid-state device (SSD), sometimes known as a flash drive.

Figure 8:
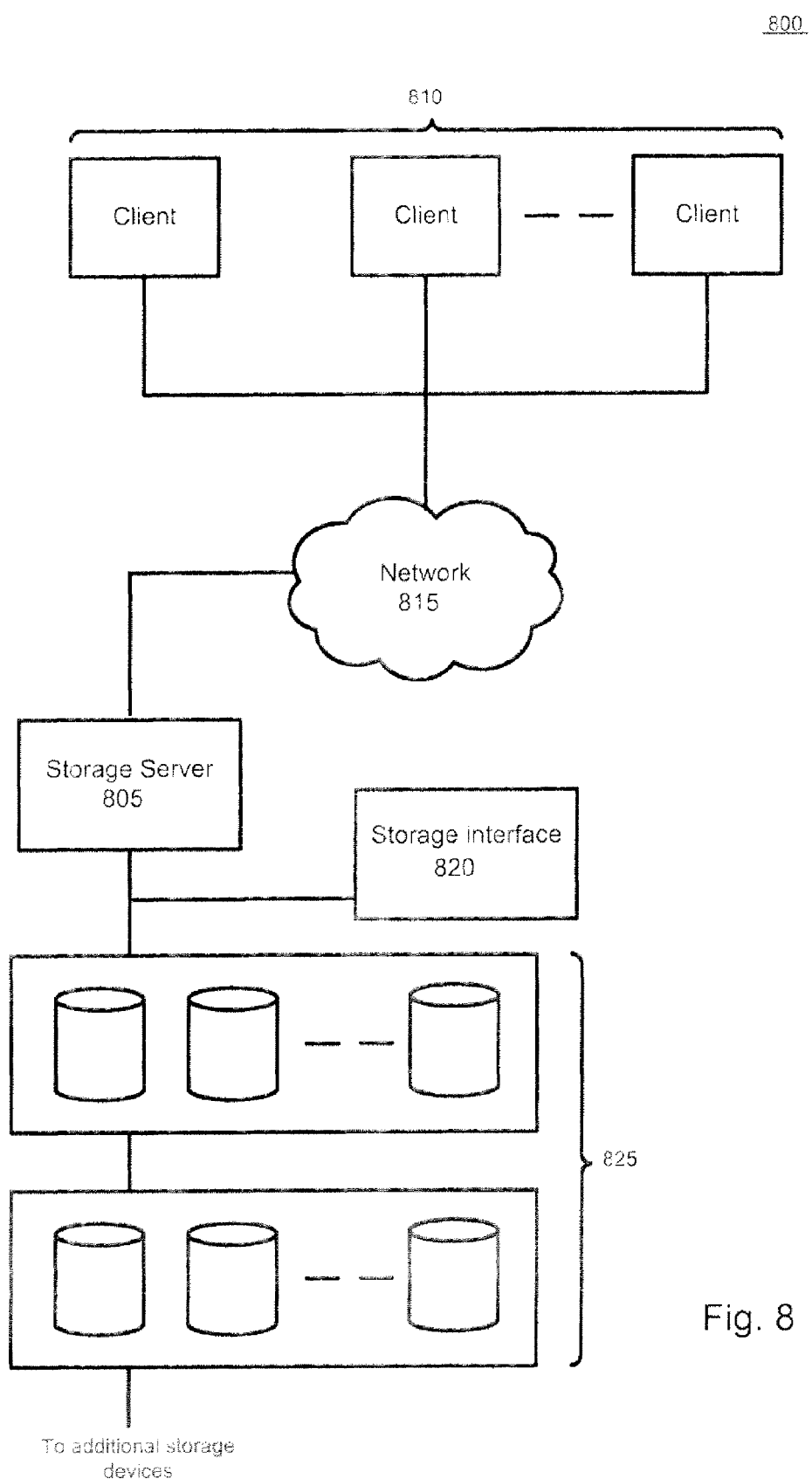
FIG. 8 is a diagram of a storage system.

FIG. 8 illustrates a data storage system useable with some embodiments of the present invention. The system 800 includes a storage server 1005, storage interface 820, a network 815, a number of storage subsystems 825 coupled to the storage server 805, and a number of client machines 810 coupled to the storage server 805 via the network 815. The network 815 may include a wide area network (WAN), a local area network (LAN), etc. The storage devices 825 may include a number of storage devices (e.g. disks) organized in shelves. The disks may include one or more Redundant Array of Independent Disks (RAID) volumes.

Although illustrated as a self-contained element, the storage server 1005 may have a distributed architecture; for example, it may include a separate N-("network") blade and D-(disk) blade (not shown). In such an embodiment, the N-blade is used to communicate with clients 1010, while the D-blade includes the file system functionality and is used to communicate with the storage subsystem 825. The N-blade and D-blade communicate with each other using an internal protocol. Alternatively, the storage server 805 may have an integrated architecture, where the network and data components are all contained in a single box. The storage server 805 further may be coupled through a switching fabric to other similar storage servers (not shown) which have their own local storage subsystems. In this way, all of the storage subsystems can form a single storage pool, to which any client of any of the storage servers has access. In one embodiment, storage server 805 may be data processing system 900.

Note that any or all of the components of system 800 and associated hardware may be used in various embodiments of the present invention. However, it can be appreciated that other configurations of the data storage system may include some or all of the devices disclosed above.

In one embodiment, the system 800 includes a storage area network (SAN) to transmit read/write requests at the block level of the storage server 805. A block is the basic unit of data used to store data in the SAN. In an alternate embodiment, the system 800 is a network-attached storage (NAS) system that transmits data at the file level. In the NAS system, complete files are retrieved instead of blocks on a disk. The NAS system uses file access protocols to retrieve data, such as, for example, Network File System (NFS), or Common Internet File System (CIFS). The SAN and the NAS systems may be implemented in a single server or in separate servers.

In practice, the methods 300 and 500 may constitute one or more programs made up of computer-executable instructions. Describing the methods with reference to the flowcharts in FIGS. 3 and 5 enables one skilled in the art to develop such programs, including such instructions to carry out the operations (acts) represented by logical blocks in FIGS. 3 and 5 on suitably configured computers (the processor of the computer executing the instructions from computer-readable storage media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the methods illustrated in FIGS. 3 and 5 without departing from the scope of the invention and that no particular order is implied by the arrangement of blocks shown and described herein.

Encryption with copy-on-encrypt has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Moreover, the description of FIGS. 7 and 8 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

It will be appreciated that certain embodiments of the present invention may be implemented with solid-state memories including flash storage devices constituting storage array 825. For example, the encryption with copy-on-encrypt may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

Therefore, it is manifestly intended that this invention be limited only by the following claims and equivalents thereof.

What is claimed is:

1. A method comprising:
    determining, by a computer, that plaintext data stored in a plaintext buffer is to be written out to an encrypted storage resource;
    in response to the determination, allocating an encryption buffer;
    copying the plaintext data from the plaintext buffer to the encryption buffer;
    encrypting the plaintext data of the encryption buffer to generate encrypted data;
    writing the encrypted data from the encryption buffer to the encrypted storage resource;
    de-allocating the encryption buffer; and
    simultaneously satisfying read and write requests from a client by retrieving the plaintext data from the plaintext buffer while the encryption is proceeding.

2. The method of claim 1, wherein the plaintext buffer and the encryption buffer are stored in a cache memory coupled to a storage server.

3. The method of claim 2, wherein the encrypting is performed by a hardware device coupled to the storage server.

4. The method of claim 3, wherein the hardware device performs the encryption using an encryption key provided by a remote key manager coupled to the storage server.

5. The method of claim 1, further comprising:
    receiving a request to delete the encrypted storage resource; and
    in response to the request, destroying an encryption key used to encrypt the storage resource.

6. A non-transitory computer readable storage medium storing executable instructions which when executed by a processor cause the processor to perform operations comprising:
    scanning a cache to identify locations of data elements to be written out to an encrypted storage volume;
    copying un-encrypted data front the identified locations in the cache to new locations in the cache;
    encrypting the un-encrypted data at the new locations to generate encrypted data;
    marking the new locations as ready to be written out from the cache to the encrypted storage volume; and
    writing the encrypted data from the marked locations in the cache to the encrypted storage volume.

7. The non-transitory computer readable storage medium of claim 6, wherein copying un-encrypted data further comprises:

for each of the data elements, changing a value of an input/output pointer corresponding to the data element from the identified location of the data element to the new location of the data element.

8. The non-transitory computer readable storage medium of claim 6, the operations further comprising:
   receiving a request for data stored on the encrypted storage volume;
   copying an encrypted version of the data from the encrypted storage volume to a read-in location in the cache;
   computing a checksum for the encrypted data at the read-in location;
   comparing the computed checksum for the encrypted data to a stored checksum for encrypted data;
   decrypting the encrypted version of the data to generate a plaintext version of the data;
   computing a checksum for the plaintext version of the data; and
   updating a value of a checksum for the read-in location with the checksum for the plaintext version of the data.

9. A storage server comprising:
   a hardware crypto device coupled to a bus;
   a processor coupled to a memory through the bus;
   a cache coupled to the bus;
   a key manager coupled to the bus;
   a storage subsystem coupled to the bus; and
   executable instructions stored in the memory which when executed by the processor cause the processor to:
      initiate a consistency point operation,
      identify buffers within the cache containing plaintext data to be written out from the cache to an encrypted storage resource stored in the storage subsystem,
      allocate new buffers in the cache,
      copy plaintext data from the identified buffers to the new buffers,
      mark the new buffers to be encrypted,
      signal the hardware crypto device to perform encryption, and
      write out encrypted data from the new buffers in the cache to the encrypted storage resource stored in the storage subsystem.

10. The storage system of claim 9, wherein the hardware crypto device uses IEEE P1619 disk encryption standard.

11. The storage system of claim 9, wherein the hardware crypto device is an expansion card coupled to the bus via a expansion card slot.

12. The storage system of claim 9, wherein the key manager is coupled to the storage server through a network and the key manager is remote from the storage server.

13. The storage system of claim 9, wherein identifying buffers comprises:
   iterating through flag variables associated with the buffers; and
   determining that a value of one of the flag variables indicates that a buffer corresponding to the flag variable contains plaintext data to be written out to the encrypted storage resource.

14. The storage system of claim 9, further comprising:
   a memory management system coupled to the bus, wherein the memory management system is configured to reserve physical memory in the cache in response to allocating a buffer.

15. A method comprising:
   identifying, by an allocation process executing on a computer, a plaintext buffer that includes plaintext data to be written out to an encrypted storage resource;
   requesting, by the allocation process, allocation of an encryption buffer;
   copying, by the allocation process, the plaintext data from the plaintext buffer to the encryption buffer;
   setting, by the allocation process, a value of an encryption flag to a new value indicating that the plaintext data of the encryption buffer is to be encrypted;
   identifying, by an encryption process, the encryption buffer using the encryption flag;
   encrypting, by the encryption process, the plaintext data of the encryption buffer to generate encrypted data;
   setting, by the encryption process, a value of a write-out flag to a new value indicating that the encrypted data of the encryption buffer is to be written to the encrypted storage resource;
   identifying, by a write-out process, the encryption buffer using the write-out flag; and
   writing, by the write-out process, the encrypted data of the encryption buffer to the encrypted storage resource.

16. The method of claim 15, wherein the allocation process, the encryption process, and the write-out process execute in separate threads on the computer.

17. The method of claim 15, wherein the plaintext buffer is stored in a cache and wherein the plaintext data of the plaintext buffer is used to satisfy cache read requests.

* * * * *